United States Patent [19]

Simpson et al.

[11] Patent Number: 5,611,920
[45] Date of Patent: Mar. 18, 1997

[54] BIOCIDE TREATMENT SYSTEM AND METHOD

[75] Inventors: Gregory D. Simpson, Deer Park; Garry D. Laxton, Pasadena, both of Tex.; Harold D. McCullough; Jay T. Miller, both of Hobbs, N.M.

[73] Assignee: Unichem International Inc., The Woodlands, Tex.

[21] Appl. No.: 492,394

[22] Filed: Jun. 19, 1995

Related U.S. Application Data

[62] Division of Ser. No. 146,590, Nov. 1, 1993, Pat. No. 5,453,207.
[51] Int. Cl.⁶ ..................................................... C02F 1/76
[52] U.S. Cl. ...................... 210/192; 210/198.1; 210/2.11; 423/477
[58] Field of Search ............................... 210/198.1, 192, 210/241; 423/477

[56] References Cited

U.S. PATENT DOCUMENTS

| | | |
|---|---|---|
| 4,383,920 | 5/1983 | Muller et al. |
| 4,514,294 | 4/1985 | Layman et al. |
| 4,966,716 | 10/1990 | Favstrisky et al. |
| 5,009,875 | 4/1991 | Kelley et al. |
| 5,102,503 | 4/1992 | Silinski et al. |
| 5,256,310 | 10/1993 | Brooks. |

FOREIGN PATENT DOCUMENTS

| | | |
|---|---|---|
| 2361192 | 6/1974 | Germany. |
| 2413243 | 9/1975 | Germany. |
| 150849 | 11/1979 | Japan. |
| 299694 | 12/1989 | Japan. |

*Primary Examiner*—Neil McCarthy
*Attorney, Agent, or Firm*—Browning Bushman

[57] ABSTRACT

A system and method for the delivery and application of a biocide treatment to a facility. A specially adapted vehicle is used to transport biocide precursors, and a generator capable of generating biocide from those precursors, to the site of the facility to be treated. Incompatible precursors are isolated from each other in separate compartments in the vehicle. At the site, the generator is communicated with a fluid flow path passing through the facility to be treated. While biocide is being generated in the generator from the precursors, a carrier liquid is simultaneously circulated through the fluid flow path, including the generator, so that biocide from the generator is introduced to the carrier liquid and thereby carried from the generator through the facility to treat it. When treatment is complete, the operation of the generator and the circulation of the carrier liquid are stopped, the generator is disconnected from the facility, and the generator and precursors are transported away from the facility site in the vehicle.

37 Claims, 8 Drawing Sheets

BIOCIDE TREATMENT SYSTEM AND METHOD

This is a division of application Ser. No. 08/146,590, filed Nov. 1, 1993 now U.S. Pat. No. 5,453,207.

BACKGROUND

The present invention addresses a number of problems associated with the growth of living organisms in or about various types of fixed facilities. A typical example of such a facility would be an industrial plant in which water is circulated through a heat exchanger, cooled by passing the water through a cooling tower, and then recirculated back to the heat exchanger. Microorganisms such as bacteria, etc., can grow in the water, in the cooling tower, in the various pipes connecting those and other items to form a water flow circuit, and in some cases, in the heat exchanger. These microorganisms can create health hazards, unpleasant odors, and various other well-known types of problems. In addition, some such organisms build up considerable solid matter, such as slime and algal deposits, that can cause a host of other types of problems, such as clogged lines, slippery and dangerous surfaces, undesired insulation that interferes with proper heat transfer, etc.

Another example of a type of facility in which living organisms can create problems would be a plant that draws cooling water from a nearby natural body of water, man-made lake, or the like and/or re-injects hot water back into that body. In certain parts of North America, for example, the populations of certain non-native species of mollusks, which have been accidently introduced into North American waters via foreign vessels or the like, have, in the absence of their native predators, exploded, so that these mollusks have become pests. Some of them are quite small, and can enter into and clog the lines through which the water is taken from, or re-injected into, the body of water, and can even be carried further into the plant with the water stream, thereby causing problems.

Accordingly, there are a number of different types of facilities in which it is desirable to be able to kill and eliminate such organisms, in as safe and trouble-free a manner as possible, and preferably without the need to shut down the normal operation of the facility.

Current systems and methods for addressing these problems leave much to be desired.

Probably the most common substance currently used in the treatment of heat exchangers, cooling towers, and like facilities in industrial plants is chlorine gas. Because this biocide is used in a gaseous form, it is necessary to have large quantities available for treatment, and this gas is typically stored in large containers at the site of the facility whose treatment will be required. As is well known, chlorine gas is very dangerous. Therefore, fairly onerous safety precautions are necessary. It is usually necessary to obtain special permits for the storage and use of this gas, and complying with the requirement to obtain such permits can be burdensome. Specially trained operators are typically kept on the staff of the facility using the chlorine gas for biocide treatment.

Chlorine dioxide is an even better biocide than chlorine gas. It can even clean high efficiency PVC fill, which is sometimes used in cooling towers. However, in gaseous form, it is even more dangerous than chlorine gas. Furthermore, various precursors or reagents from which chlorine dioxide can be formed are dangerous or harmful. These include (depending on the process) chlorine gas itself, sodium chlorate, sodium chlorite, sodium hypochlorite, and/or strong acids. Though the sodium chlorite is used in a liquid solution, which is therefore easier than gas to contain or recapture if it is spilled, once it is spilled and dries, it leaves a very problematic residue that is highly flammable in conjunction with organics.

There have been some efforts in the past to provide chlorine dioxide dissolved in a carrier liquid such as water, for purposes of cleaning up petroleum spills and/or residues, e.g. around oil fields. It is believed that, in at least one such instance, it was attempted to provide a chlorine dioxide generator, along with all necessary materials, in a portable system, e.g. chemicals, generator, etc., on a "goose neck" trailer on one truck, and water on another truck. This system was limited to small applications, and even then, employed a large, unwieldy system, with various potential safety problems. It was not suitable for industrial plants.

Another portable system, using sodium chlorate as a precursor, is believed to have been offered, likewise, for use in oil field applications. It was likewise unsuitable for industrial plants, and apparently unsuccessful even in the oil field.

Accordingly, the general tendency has been to avoid the use of chlorine dioxide for biocidal treatment of fixed facilities such as plants.

SUMMARY OF THE INVENTION

The method of the present invention involves generating biocide and using it as a biocide to treat a fixed facility. The biocide is delivered to the facility in a carrier liquid, preferably water, thereby eliminating many of the dangers involved in attempting to utilize chlorine dioxide gas. Indeed, when thus delivered in solution, the presently preferred biocide, chlorine dioxide, is, in many respects, safer than the previously dominant biocide, chlorine gas.

The method and system of the present invention also eliminate many of the burdens previously imposed on users of such chlorine-based biocides by delivering the biocide itself, and all necessary precursors, except the carrier liquid, in a portable form. The ability to do this is preferably enhanced by the use of a generation process that can utilize all reagents in a liquid form, e.g. respective aqueous solutions. More specifically, a specialized vehicle, with many features for ensuring the safety of the transportation and use of these chemicals, brings to the site everything necessary, except the carrier liquid, including a trained operator who need not be part of the plant's own staff. After a particular treatment is finished, all hazardous materials are removed in the same vehicle.

However, unlike the more primitive portable system described above, the system and method of the present invention are not dependent on the use of a carrier liquid that must be provided within the portable system. On the contrary, it is preferred that the carrier liquid used in the present method and system be water that is already being circulated in the facility to be treated and that is available in very large volumes, realistically as much as the operator may want. Water flowing through a permanent circulation system in the facility, and specifically circulating through the particular items to be treated, is detoured through the biocide generator carried on the vehicle so that the biocide is introduced into the water simultaneously with its generation. Thus, there is no significant presence of the biocide in gaseous form anywhere in the system. Furthermore, because of the large volume of water available from the plant's own circulation system, chlorine dioxide can be utilized in relatively low concentrations that do not create the corrosion problems described in the Background above.

The method of the present invention is preferably performed in two phases. In a first or threshold phase, the goals are to provide an initial cleanup of the facility to be treated and also to determine a treatment schedule to be used in the second or maintenance phase. In the first or threshold phase, relatively low dosages of the biocide are introduced more or less continually to the flow path of the carrier liquid through the facility to be treated. This is because, if higher concentrations were introduced, large quantities of the solid material of, for example, algal deposits or slime, could be sloughed off too quickly, and could cause problems such as clogging of heat exchangers, screens, etc. In preferred methods, the concentration of chlorine dioxide used in this initial cleanup operation may be on the order of less than 3000 ppm in the generator and 2 ppm or less in the facility being treated. Because of this very low dosage, it is, as mentioned, necessary to treat almost continually, possibly over a course of several days, or even several weeks. Therefore, in this first phase, a portable generator and portable containers of precursors may be delivered to the site of the facility, removed from the transport vehicle, and housed in a temporary building or shack, all of which can be removed after the threshold phase has been completed.

After the initial cleanup has been accomplished in the threshold phase, the threshold phase may continue, in order to empirically develop a recommended treatment schedule, including dosage, treatment time and treatment frequency, for the maintenance phase.

In the maintenance phase, the dosages are still low enough to avoid the corrosion and other dangerous problems described in the above background of the invention, e.g. less than or equal to about 3000 ppm for chlorine dioxide in the generator.

The concentrations used in the facility can be somewhat higher than 2 ppm, if need be, and in any event, the maintenance treatments can usually be of fairly short duration due to the initial clean-up. Therefore, for the maintenance phase, the generator and precursors are preferably not only transported to the site, but also utilized, right in a specialized vehicle, which transports them away after each maintenance treatment.

As used herein, concentrations in ppm are quantified with reference to the flow rate through the flow path, not the total volume of liquid therein. For example, 2 ppm would mean two pounds per day for a facility circulating one million pounds per day. It can be appreciated that this is equivalent to $2/24=1/12$ lb. per hour, as the plant circulates $2/24=1/12$ million lb. per hour.

As previously mentioned, this vehicle and related parts of the system include many special safety features, which literally make it practical to safely and conveniently use the superior biocide chlorine dioxide at industrial plants and other such fixed facilities. Indeed, the safety and convenience of this system, especially to the plant operator, is better than for currently conventional uses of the less effective biocide chlorine gas.

Moreover, the present invention does not require chlorine gas, or any other gas, as a precursor.

The vehicle is specially tailored to provide separate compartments for isolating incompatible precursors from one another and from the generator, except when deliberately communicated with the generator in order to generate biocide. Each precursor compartment has a drain, and its own separate spill containment basin, so that any spills are contained, but incompatible chemicals are still kept isolated from one another. The generator compartment also has a drain that communicates with one of the containment basins, i.e. one containing chemicals with which the biocide itself is compatible.

Special structures are provided for firmly securing the containers of precursors so that they do not shift or turn with respect to the vehicle, thereby preventing spills to begin with. The vehicle is also provided with crush space and protective roll bars to further ensure against spillage of chemicals in the event of a collision or other damaging accident to the vehicle.

The vehicle also carries various safety equipment such as protective garments and a neutralizer(s) that can be used on any harmful precursors that may be spilled.

Other safety features involve fail-safe and backup means for stopping the flow of precursors when any one of a number of conditions exists, e.g. shutdown of the generator, loss of adequate water flow, loss of power.

Another salient aspect of the invention involves the methods and means whereby the various lines are flushed, to remove residues of harmful chemicals, before the generator is disconnected and removed from the site. Special means and techniques are provided for flushing each of the conduits that has been used to deliver a respective precursor to the generator. Then, with communication between the precursors and the generator having been stopped, the carrier liquid or water is further circulated through the main path, including the generator. Thus, the precursor conduits are first flushed into the generator, whereafter the generator is flushed into the facility that has been treated.

Although a treatment schedule will have been developed from the threshold data, during each maintenance treatment, various factors will be monitored, both upstream and downstream of the facility, to confirm when the maintenance treatment has been effectively performed, and also to alert the operator if some change of condition indicates that t he predetermined treatment schedule is not working properly. If this happens, further evaluation may dictate the need for an altered treatment schedule, or may lead to the discovery of some problem in either the facility being treated or the system being used to perform the treatment.

Many other features and advantages of the present invention will be disclosed in the following detailed description and claims, and illustrated in the drawings.

DETAILED DESCRIPTION

Figure 1:
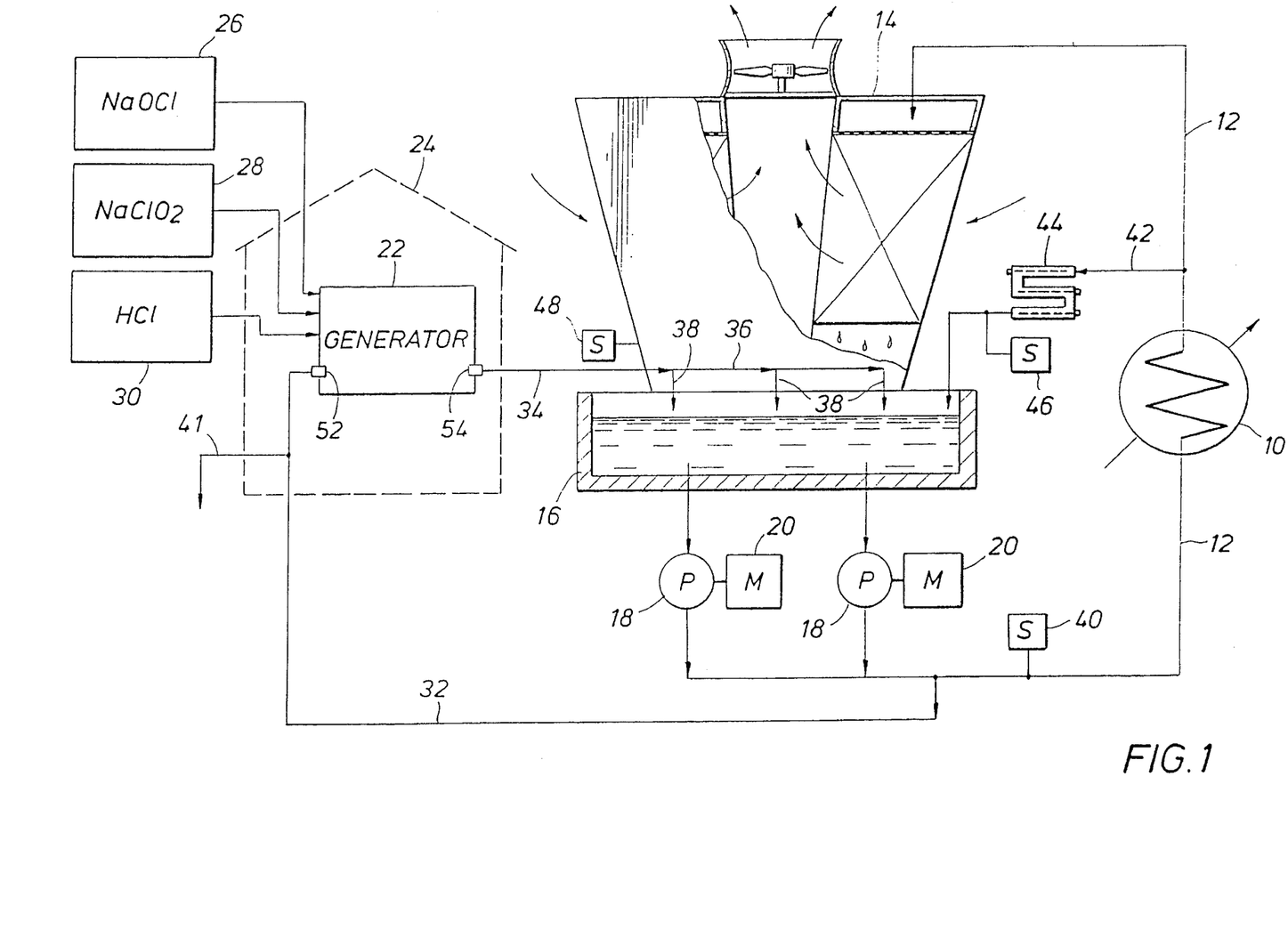
FIG. 1 is a diagrammatic view of a system in accord with the present invention in the process of a threshold phase treatment of a plant.

FIG. 1 diagrammatically illustrates a facility of a type that may be treated in accord with the method and system of the present invention. In this specification, "facility" is used in a very general sense to indicate an industrial plant, or portion(s) thereof, or any other facility or installation having areas in which fluid (gas and/or liquid) is held and/or handled and in which undesired organisms may be present.

In the example shown, the facility being treated is a plant that includes a heat exchanger 10 through which water is pumped via line 12. Water becomes heated in the heat exchanger 10 as it cools whatever substance is being cooled in the heat exchanger. The heated water then continues through line 12, which delivers it into the top of a cooling tower 14, which may be of any well-known type. Water exiting the bottom of tower 14 falls into a sump 16 whence it is recirculated by pumps 18 interconnected between sump 16 and the upstream portion of line 12. Each pump 18 is driven by a motor 20. Undesirable microorganisms can grow in, and be particularly problematic in, heat exchanger 10 and cooling tower 14, although they will also exist in the various lines interconnecting those items. A system in accord with the present invention is shown in FIG. 1 as set up to treat both the heat exchanger 10 and the cooling tower 14. Since these are the main items to be treated, they will be specifically monitored, upstream and downstream, as will be explained more fully below. However, it should be understood that the biocide will be pumped through the entire circuit so that any microbial accumulations in the interconnecting lines or other parts of that circuit will also be treated.

To treat this facility, a portable chlorine dioxide generator 22 and small portable shack 24 have been transported to the site of the facility. Since the first phase of the method, illustrated in FIG. 1, may take some time, the generator 22 and it shack 24 are removed from the vehicle in which they were transported. Containers 26, 28, 30, which were separately transported to the site, are placed outside the shack 24. Each of the containers 26, 28 and 30, respectively, contains one of three precursors, the three of which are used in generator 22 to produce chlorine dioxide. As indicated, for the exemplary embodiment, these precursors are, respectively, sodium hypochlorite (i.e. industrial strength chlorine bleach), sodium chlorite, and hydrochloric acid, each in an aqueous solution. Presently preferred concentrations (by weight) for these solutions are:

for sodium hypochlorite—10–13%;
for sodium chlorite—25%; and
for hydrochloric acid—15 %.

After the apparatus shown enclosed in shack 24 has been emplaced at the plant site, a portion of the plant's circulating water is detoured through the generator 22. This can be done in any number of ways that will suggest themselves to those of skill in the art. In the system shown, a generator intake line 32 is tapped into the plant system line 12 just downstream of pumps 18 and communicated with a main inlet 52 of the generator 22. Generator intake line 32 is appropriately sized and/or throttled so that only a desired portion of the water being handled by pumps 18 is detoured therethrough. A generator output line 34 is interconnected between an outlet 54 of the generator 22 and a header assembly 36 positioned to discharge into sump 16 through a plurality of outlets 38. As water from line 32 passes through the generator, chlorine dioxide is introduced into it, as will be described more fully below, and line 34 and header 36 carry the solution of chlorine dioxide in water to the sump 16. Since only a portion of the water pumped out of the sump 16 by pumps 18 detours through line 32, the remainder of the water, which will be pumped via line 12 into the heat exchanger 10, contains chlorine dioxide that will treat microorganisms in the heat exchanger.

A sample collecting tap 40 is installed in line 12 upstream of the heat exchanger 10. Downstream of the heat exchanger 10, a branch line 42 leads away from line 12, through a labyrinthine corrosion rack 44 and into the sump 16. A second sampling tap 46 is disposed near the downstream end of corrosion rack 44. By periodically drawing samples at points 40 and 46, and testing them for the presence of chlorine dioxide, and/or other factors indicative of microbial life, the operator can determine how well and how quickly the treatment is working. Corrosion coupons (test metal strips) can also be removed from the corrosion rack 44 to observe the long-term effective corrosiveness of the water that has passed through the heat exchanger 10. In addition, linear polarization probes in the rack determine instantaneous corrosion rates.

The bulk of the water passing out from heat exchanger 10 through line 12 does not go through the small branch line 42, but rather passes on through line 12 and into the cooling tower 14. Thus, sample tap 46 also serves as an upstream sample tap for observing the progress of treatment of the cooling tower, a downstream sample collection point 48 being provided near the bottom of the cooling tower 14. Again, by testing and comparing periodic samples from points 46 and 48, progress of treatment of the cooling tower 14 can be monitored.

Still another sample tap 41 may be provided in intake line 32, upstream of generator 22, for determination of the residual chlorine dioxide solution strength being sent to heat exchanger 10. This residual, when compared to that obtained at sample point 46, gives an indication of the chlorine dioxide demand created by the biological growth throughout the system. This, in turn, indicates when treatment is complete.

As mentioned, the setup shown in FIG. 1 is designed to provide treatment of both the heat exchanger 10 and the tower 14. If it were desired to treat the heat exchanger 10 only, sample tap 48 could be eliminated. On the other hand, if it were desired to treat the cooling tower only, tap 40 and line 42 could be eliminated; the outlet from the generator 22 would be communicated by a suitable connecting line into line 12 between heat exchanger 10 and tower 14; an upstream sample tap would be provided in line 12 between the generator outlet line and the tower 14, and downstream sample tap 48 would remain where it is. Numerous other kinds of arrangements will suggest themselves to those of skill in the art, depending upon the kind of plant, and which facilities within that plant require treatment.

In any event, in the threshold phase of the method, as illustrated in FIG. 1, it is desirable to avoid massive kill-off or sloughing of solid material that has built up due to the growth of microorganisms. Accordingly, the introduction of chlorine dioxide to the water is continual (i.e. frequent or continuous) but at very low dosage. It should be less than 3000 ppm in the generator, and after further dilution in sump 16, less than or equal to about 2 ppm at upstream sample point 40, at least at the beginning of treatment. Depending upon the observations of the operator, this dosage may be increased and/or the time between doses may be increased toward the end of the threshold phase. In any case, when the concentration of chlorine dioxide at sample points 40 and 46 becomes close, the operator can conclude that the heat exchanger 10 has been effectively cleared of microorganisms, since the chlorine dioxide is no longer being used up by reaction with such microorganisms. Similar comparisons of points 46 and 48 will indicate the condition of tower 14, but the fact that considerable chlorine dioxide flashes in tower 14 (reducing concentration at 48 even without microbial reaction) must be factored in. The operator's tests, including observations of the time taken for the initial cleanup, correlated with dosage and frequency, can be used to plan a maintenance treatment schedule for the facility in question. If necessary or desirable, the shack 24 and the items therein may remain in place inactive for some time, and then used to perform one or more interim treatments, tests of which may help to develop the proposed treatment schedule. Then, the shack 24 and all of its contents can be removed from the plant site until it is time for the first regular maintenance treatment. "Precursor" is used herein to generally refer to a reagent from which the biocide is generated, a solution or other mixture of such reagent or any other substance (e.g. a catalyst) that, whether or not through actual reaction with all the other precursors, forms a part of, or plays a role in the generation of, the biocide.

Figure 2:
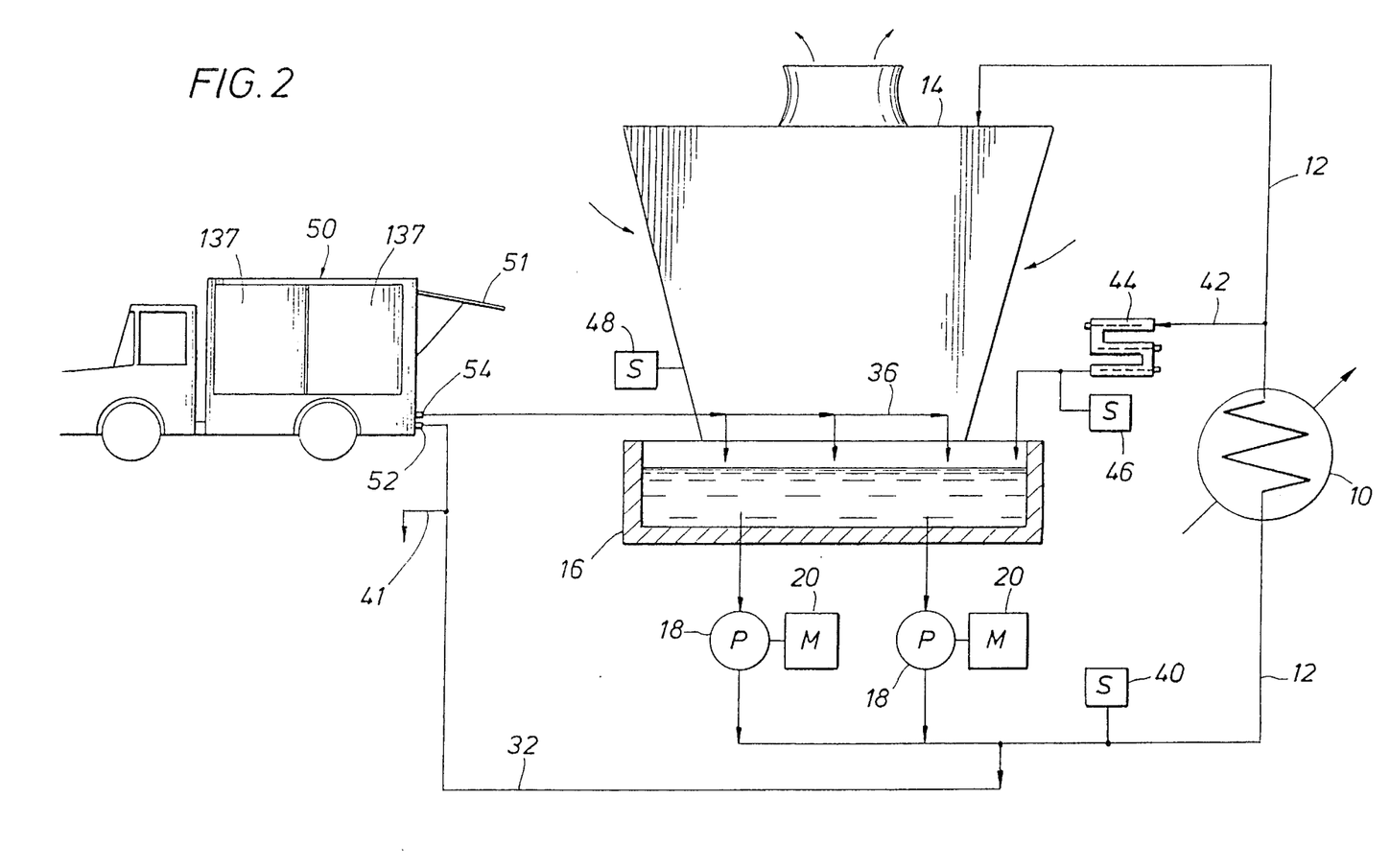
FIG. 2 is a view similar to that of FIG. 1 showing the maintenance phase of the method.

For maintenance treatments, the generator 22, all necessary biocide precursors, and all other equipment necessary for treatment and testing, as well as safety equipment, are transported to the site of the facility in a specialized truck 50, as shown in FIG. 2. Such transportation of the precursors is facilitated by the fact that the reaction can use them in nongaseous form, preferably aqueous solution. Truck 50 also serves as a work station for the operator. In FIG. 2, all parts that bear essentially the same structural and functional relationship to the generator carried in truck 50 as they did to the generator 22 in FIG. 1 have been given like reference numerals. Also, the generator 22 itself in truck 50 has been given the same reference numeral as that in FIG. 1, since these two generators can be virtually identical.

Because the maintenance schedule will have been planned such that maintenance treatments are provided well before the level of microbial buildups that may have been present prior to the initial cleanup, the maintenance treatments can be relatively short in duration, and they can also be done at higher dosages or concentrations, even further shortening the treatment time.

Even though a treatment frequency, treatment time, and dosage are prescribed by the maintenance schedule, the operator will still sample and test at points 40, 46 and 48 to confirm the effectiveness and timing of the treatment. Many other useful tests on the samples may be performed, as desired by the customer, right in the laboratory area 56 (see FIG. 4) of the truck 50. More specifically, the lab area 56 may consist of extra space in the rear of the truck, with work surfaces and all necessary lab equipment. A vertical transverse wall 58 separates the generator and lab compartments from the forward compartments 136 and 142, to be described below. A wall 57 subdivides the rear into lab 56 and a compartment for generator 22. A lengthwise vertical wall 60 separates the lab compartment 56 from a rear storage compartment 62.

Figure 9:
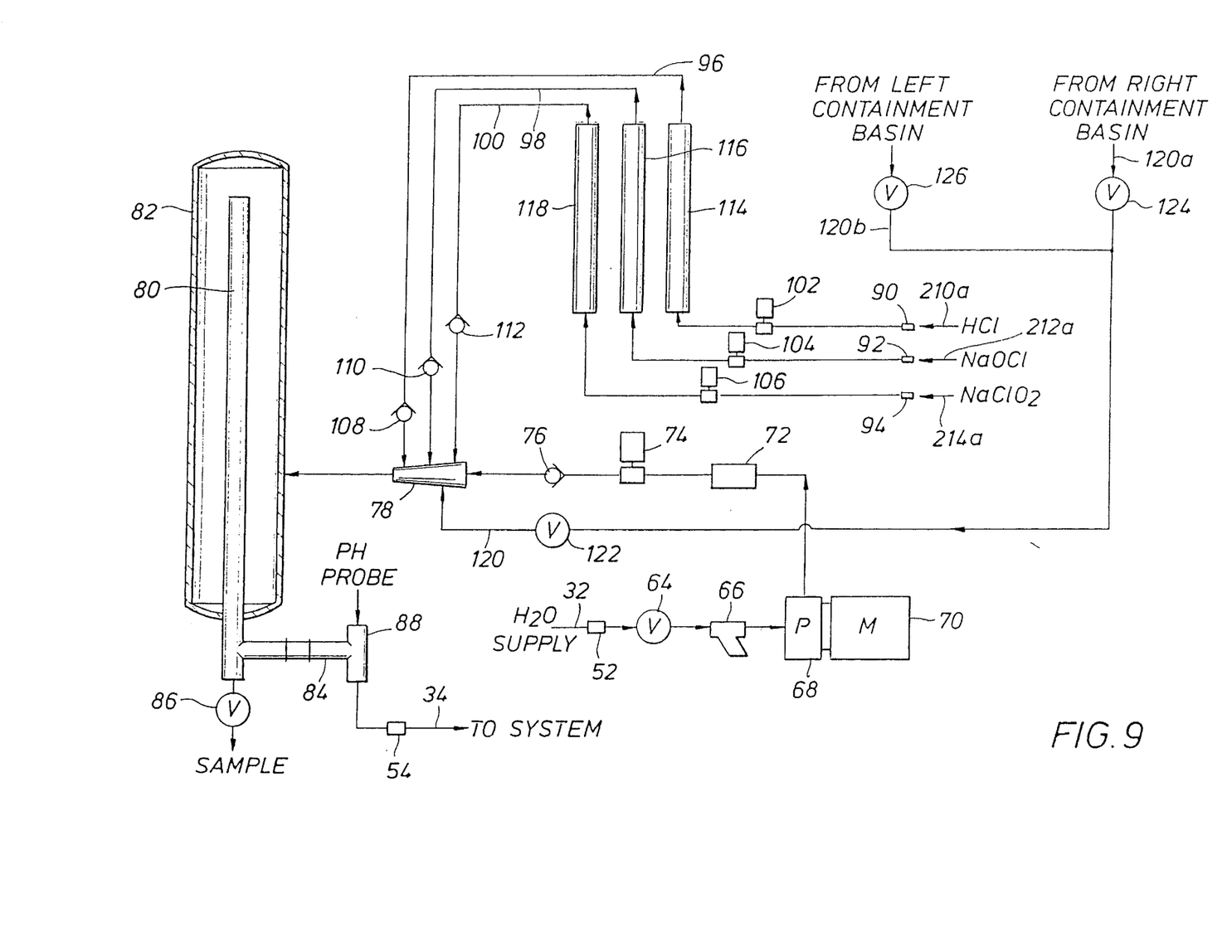
FIG. 9 is a schematic of the generator.
Figure 10:
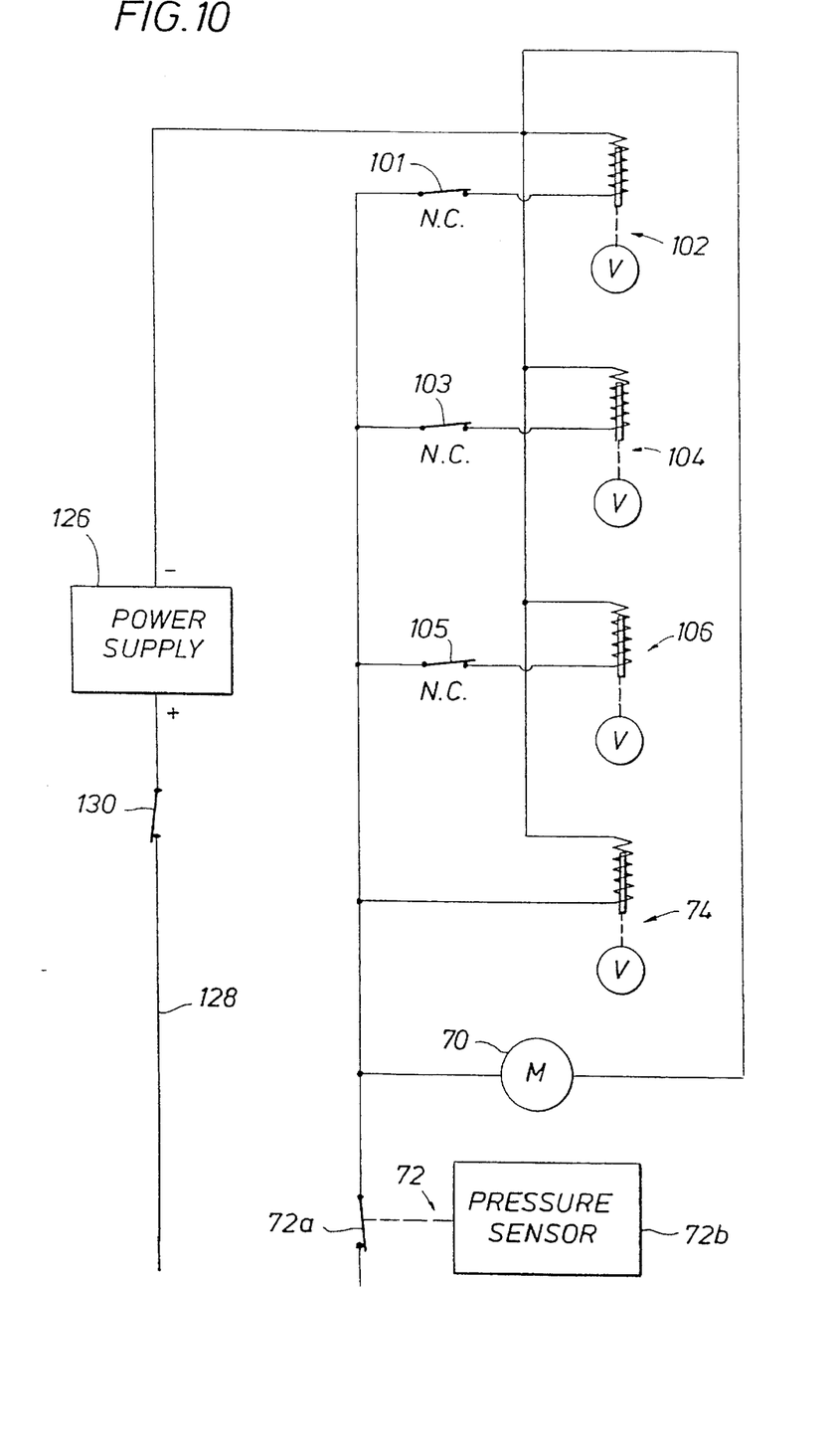
FIG. 10 is a circuit diagram illustrating some of the electronics associated with the generator.

Turning now to FIGS. 9 and 10, the generator 22 will be described in greater detail. However, since such generators are known, and commercially available from International Dioxide Inc. of Clark, N.J., the generator will be described only in such detail as is necessary to understand its role in connection with the present invention. Generator 22 has a main internal flow way extending from its main or carrier liquid inlet 52 to its outlet 54. Just inwardly of inlet 52 is a manually operable valve 64, which the operator may open or close to admit or block water from line 32. Just inward of valve 64 in the main flow way is a strainer 66 that keeps solids that may be present in the water from entering the inner parts of the generator 22.

The generator has its own pump 68, in the main flow way, preferably near the upstream end. In this case, the pump is shown as being connected into the main flow way just downstream of strainer 66, and powered by its own motor 70. Downstream of the pump outlet, the main flow way has a pressure-sensitive switch 72, followed by a solenoid valve 74, open only when power is supplied thereto, followed by a check valve 76 that permits fluid flow from the pump toward the reaction chamber 80 only.

A Venturi eductor 78 has its primary internal flow way connected into, and forming a part of, the main flow way of the generator between check valve 76 and reaction chamber 80. Eductor 78 has other lateral incoming lines, described below, and in the well-known manner, the flow of water through its main flow way will create a suction that draws fluids in through the other lines.

Since eductor 78 carries the water stream, and also sucks in all necessary precursors, the carrier water and precursors are carried jointly to the reaction chamber 82. Thus the chlorine dioxide is actually generated in the carrier water. Thus, chlorine dioxide does not exist in a dangerous gaseous form anywhere in the system.

Finally, the main flow way of the generator 22 includes an outlet line 80, 84 communicating the downstream end of reaction chamber 82 with the generator outlet 54, and thus via line 34 to the facility to be treated. Branching off from outlet line 84 are a sample tap valve 86 and a pH probe site 88.

Generator 22 also has three precursor inlets 90, 92 and 94, each of which may be communicated, in a manner to be described below, with a respective precursor container. Respective auxiliary flow ways 96, 98 and 100 communicate the precursor inlets 90, 92 and 94 with respective lateral inlets of the eductor 78, whereby the main flow of carrier water through eductor 78 will suck the precursors in through their respective auxiliary flow ways. Each of these auxiliary flow ways contains its own respective normally closed solenoid valve 102, 104 or 106, and a respective check valve 108, 110 or 112, preventing backflow from the eductor 78 toward the precursor inlet. Between its two valves, each of the auxiliary flow ways may also contain a respective device 114, 116, or 118, known as a "rotometer." Such a device, as known in the art, permits the operator to read the flow rate of the respective precursor, and contains an internal valve whereby the operator may adjust the flow rate of the respective precursor.

Eductor 78 has still another lateral inlet, communicating with a branch line 120 leading to spill containment basins (described below) that contain precursors that may happen to spill in the truck 50. Line 120 has a manual ball valve 122, and near its upstream end, divides into two branches 120a and 120b, each leading to a respective one of two containment basins, and each containing its own manually operable valve 124 or 126.

In the currently preferred embodiment, the biocide generated is chlorine dioxide. The preferred generation reaction utilizes two basic liquid reagents or precursors: (a) hydrochloric acid in strong (preferably saturated or near-saturated) aqueous solution, and (b) sodium chlorite, also in (preferably saturated or near saturated) aqueous solution. Any other strong mineral acid could be substituted for the hydrochloric acid as the first reagent. Also, another chlorite, such as potassium chlorite, could theoretically be used as the second reagent; however, sodium chlorite appears to be most readily available and has been found to work well.

Although chlorine dioxide could be generated from the two basic precursors alone, the reaction would be relatively inefficient. By adding a third precursor, the reaction can be made much more efficient. Preferably, the third precursor is industrial strength chlorine bleach, i.e. sodium hypochlorite in a saturated or near-saturated aqueous solution. It may, theoretically, be possible to use some other hypochlorite if it can be acceptably carried and introduced to the generator. However, the bleach, at least at present, appears to be the most practical thing to use.

Referring now to FIG. 10, a simplified example of some of the electronics, particularly as may be associated with the various solenoid valves, is disclosed. It will be appreciated that, because the precursors are sucked into the main flow path by virtue of sufficient flow of water through eductor 78, then if that water flow should drop for any reason, e.g. loss of power, pump failure, etc., then the precursors will stop flowing as well. However, the solenoid valves 102, 104 and 106 provide backup or fail-safe mechanisms to positively prevent precursor flow, and solenoid valve 74 performs a similar function for the main flow way. As shown in FIG. 10, the pump motor 70 and the four solenoids 74, 106, 104, and 102 all receive power from source 126 via a conductor 128 in which is disposed the pressure-sensitive switch mechanism 72. Mechanism 72 is of a known type of which switch 72a will remain closed if sufficient fluid pressure is sensed by sensor 72b, but will open if the pressure drops below a predetermined value. Thus, if the water flow drops or stops, switch 72a will open, causing pump motor 70 to stop, and also causing all four of the solenoids to lose power, whereby they will move, under spring bias, their associated valves to their closed positions, shutting off the main flow way as well as the three auxiliary flow ways. A manually operable switch 130 can be used to shut down the system, and it can be appreciated that if the power supply is otherwise cut off, e.g. by accidental cutting of an incoming cable, the pump motor 70 and the four solenoids will lose power and automatically shut down the system.

If desired, individual switches 105, 103 and 101 may be provided to selectively deactivate solenoids 106, 104 and 102, respectively, for independent control of the three auxiliary precursor lines. Manual valve 64 can be used to independently control the main line. Thus, for example, when shutting down, switches 101, 103 and 105 can be opened first, shutting off flow of precursors only, while water combines to circulate to flush residual chemical from the generator into the plant being treated. Then, opening switch 130 shuts off the water flow. In a preferred automated version, a timer may be associated with valve 74 so that, if main switch 130 is opened, valves 102, 104, 106 will close immediately, followed, after a chosen interval, by valve 74.

The timer for valve 74 would be provided with an auxiliary power source adapted to be shut off in the event of accidental loss of power or water pressure, as opposed to deliberate opening of a shutdown switch. Detailed electronics for accomplishing this is known in the art; more specifically, it is incorporated in the aforementioned commercially available generators, Turning now to FIGS. 3–5, the construction and interior features of the truck 50 are shown in greater detail. The truck may be of any suitable type, and in any event, may be relatively compact. It includes an enclosed rear portion carrying the various other parts of the system to be described. This rear portion is reinforced by roll bars 132, each of which extends up along one side of the truck, across the top, and down along the other side to resist collapse of the truck walls and ceiling, and consequent damage to the contents, in the event of an accident. The generator 22 is disposed at one side of the rear of the truck separated from the forward part of the trailer by wall 58 and from the lab by wall 57. As can be seen by comparing FIGS. 3 and 4, the rear compartments are oversized to provide crush space, as a further precaution against damage to the generator in the event of an accident. The wall 60 divides the opposite rear side from the lab compartment 56 to form a separate storage compartment 62. In compartment 62 may be stored safety equipment, such as protective garments, a neutralizing agent for application to any spills of sodium chlorite, and any other necessary equipment. The truck has a rear door 51 (FIG. 2) for access to compartments 56 and 60. Compartment 62 may have another door, making it accessible from the inside of lab compartment 56. A horizontal divider 61 may define auxiliary overhead storage space at 63.

Figure 3:
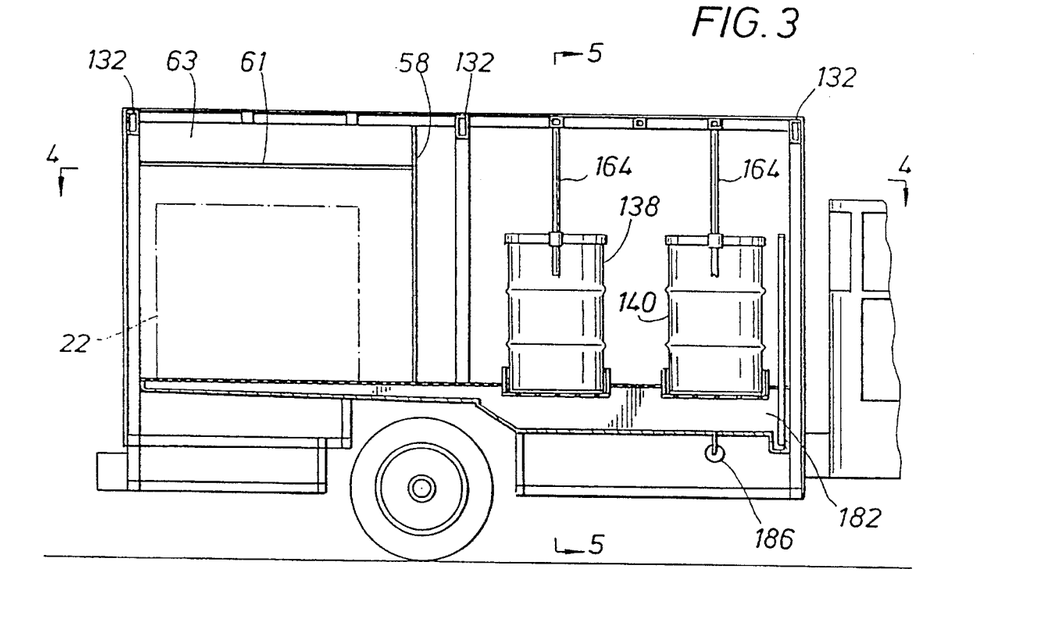
FIG. 3 is a lengthwise vertical sectional view through a portion of a vehicle forming a part of the system of the present invention, taken generally along the line 3—3 of FIG. 4.
Figure 4:
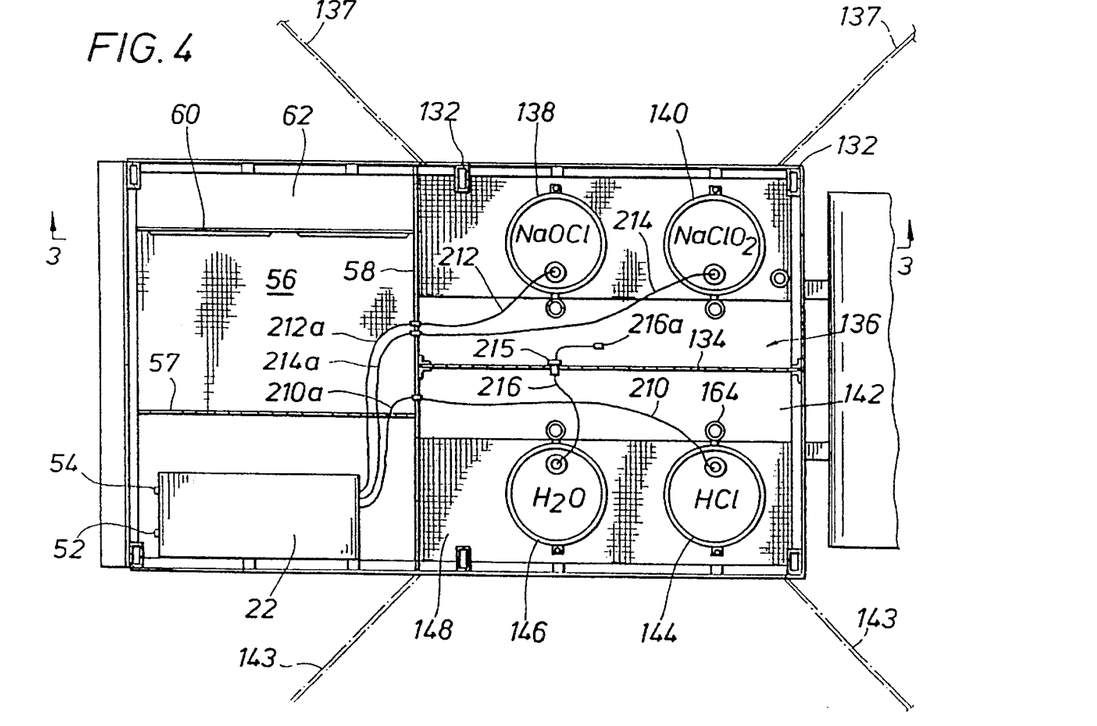
FIG. 4 is a horizontal transverse cross-sectional view taken generally along the line 4—4 in FIG. 3.
Figure 5:
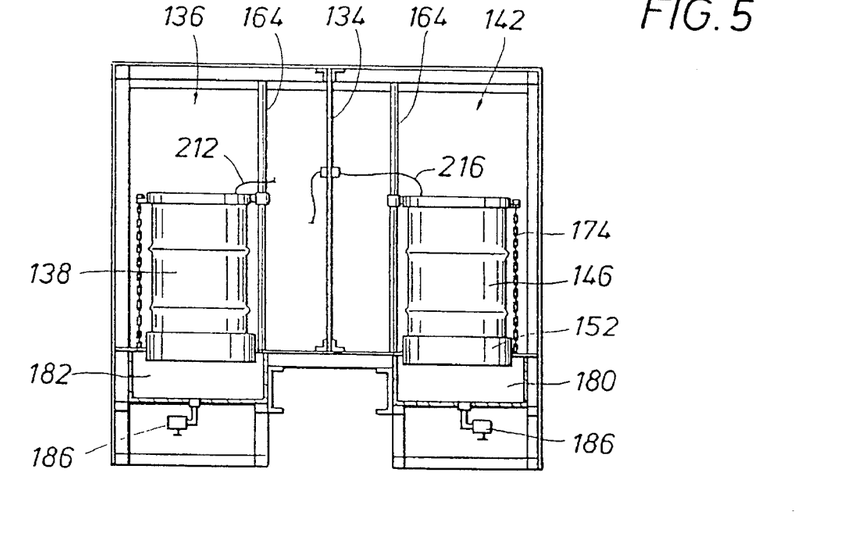
FIG. 5 is a transverse vertical cross-sectional view taken generally along the line 5—5 of FIG. 3.

The forward portion of the truck trailer is subdivided into two compartments 136 and 142 by a lengthwise vertical wall 134. Respective compartments 136 and 142 are accessed by side doors 137 and 143. The left side compartment 136 carries two drums or barrels, or other Department of Transportation approved containers, each containing a respective precursor. As shown, barrel 138 contains sodium hypochlorite (or industrial strength chlorine bleach), and barrel 140 contains sodium chlorite. These two precursors may be housed in the same compartment since they are compatible with each other in the sense that, if mixed due to accidental spillage or the like, they would not react in a way that would increase their danger or hazardous nature. The third precursor, hydrochloric acid, is not compatible with either the bleach or the sodium chlorite. Therefore, it is separated from the other precursors by being housed in the separated right hand forward compartment 142. The hydrochloric acid is contained in a barrel 144 similar to the other barrels. Compartment 142 also houses a barrel 146 of water, to be used for a purpose described below. Water and hydrochloric acid are compatible.

A number of features are provided for holding the barrels properly in place with respect to the truck and resisting jostling or overturning during transportation. These features are best seen by comparing FIGS. 3–6. The features are shown in greater detail in FIG. 6, with respect to an exemplary barrel 144, and it is to be understood that similar features are associated with each of the other barrels. Thus, only the features in FIG. 6 will be described in detail. The floor 148 of compartment 142 has a circular recess 150. A cylindrical placement rim 152 is fitted into recess 150, along its periphery, and extends upwardly therefrom. Rim 152 is sized to closely surround the bottom of barrel 144, but not so tightly as to interfere with selective removal of the barrel when needed. A bracket 154 extends laterally outwardly from rim 152.

Figure 6:
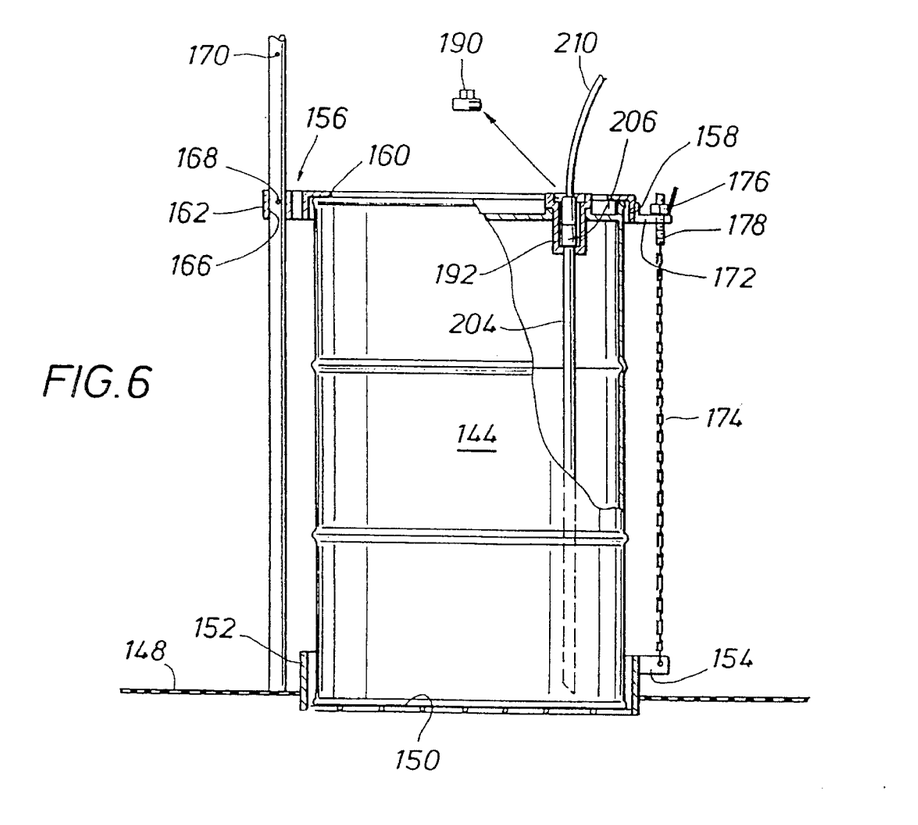
FIG. 6 is a detailed view of one of the precursor containers and associated parts of the system, on an enlarged scale.

A holding member, in the form of a rigid flanged ring 156, engages the top of the barrel 144. Ring 156 has a downwardly depending rim 158 closely surrounding the top of the drum, and a radially inwardly extending annular flange 160 overlying the outer part of the top of the drum. Ring 156 has an apertured extension 162 that slidably receives a vertical rod 164 fixed to the top and bottom of compartment 142 on the inboard side of the barrel 144. Projection 162 has a cylindrical hole 166 sized to be slidable on rod 164, but fitting closely enough to resist tilting of the ring 156. A removable pin 168 may be placed through aligned transverse holes in projection 162 and rod 164 to locate ring 156 in a lowered position engaging the upper end of the barrel 144. A second hole 170 may be provided in rod 164 at a higher elevation so that, when the pin 168 is removed and the ring 156 is raised to allow removal of the barrel 144, the ring 156 can be repinned at the higher elevation to hold it up and out of the way until it is time to replace it on the same or another such barrel.

In addition, ring 156 has a bracket-like projection 172 extending laterally outwardly therefrom diametrically across from extension 162. A tie-down chain 174 is interconnected between brackets 154 and 172 and tightened by means of a nut 176 abutting the top side of bracket 172 and threaded onto a bolt 178 affixed to the chain 174 and passing through a hole in bracket 172. Alternately, the chain arrangement could be replaced by a conventional, quick disconnect, tie-down mechanism. It will be appreciated that the rim 152, ring 156, rod 164, and chain 174 all cooperate not only to hold the barrel 144 firmly down against the floor 148 of the compartment, but also to resist torsional or twisting-type movements of barrel 144, and even rotation about its own center-line. Although shown as continuous annular members, rim 152, rim 158 and/or flange 160 may be a discontinuous series of tabs, and would still be considered to "surround" the drum, as that term is used herein.

However, as a further precaution, the floor 148, or at least that portion thereof that immediately underlies barrel 144, has drain means therein. More specifically, the floor 148 is formed by a grating. Thus, any liquids that should spill flow down into a respective containment basin 180, carried by the truck below the grated portion of compartment 142. Thus, should the operator need to open or enter compartment 142, direct contact between the operator and the spilled chemical can be avoided. Just as compartments 136 and 142 are separated from each other by wall 58, compartment 136 is provided with its own separate spill containment basin 182. The floor of the lab compartment 56 is also formed of a grating that drains into shallow collection trough 184 therebelow. Trough 184 is inclined downwardly toward, and communicates with, basin 182. As previously mentioned, the lines 120a and 120b communicate, respectively, with the two containment basins 180 and 182, and when their valves 124 and 126 are opened and the generator is operating, the spilled chemicals will be sucked into the generator by eductor 78. In addition, each basin is provided with a drainage tap 186, which allows the basin to be manually drained to the exterior of the vehicle and into a suitable vessel or the like.

Figure 7:
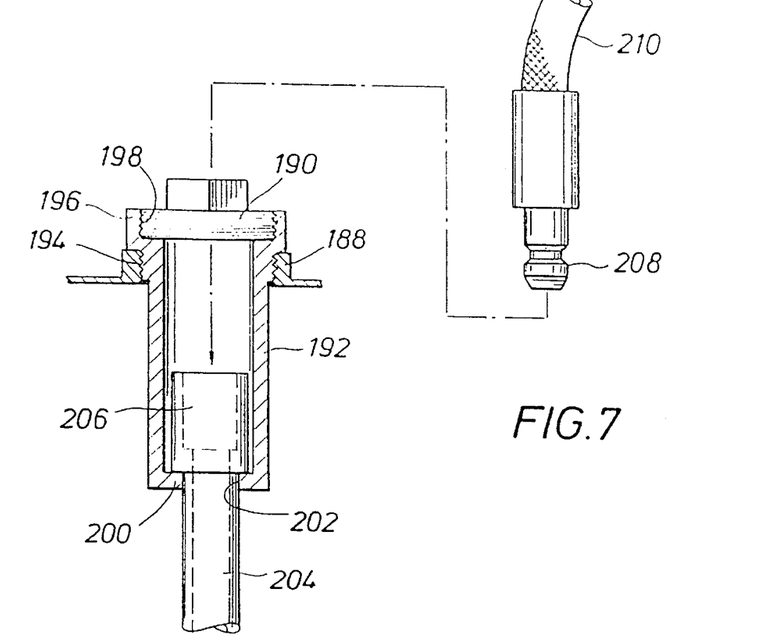
FIG. 7 is a further enlarged detailed view of the bung hole adaptor and related parts.

Referring to FIGS. 6 and 7, there are shown various parts associated with the bung hole of barrel 144, and it should be understood that each of the other barrels has similar apparatus associated therewith. Specifically, the barrel 144 has a bung hole in its top surrounded by an upstanding internally threaded rim 188. The female threads on rim 188 form the original connection means of the barrel as manufactured, adapted to receive an externally threaded plug 190, which must be in place when the drum is in transit. In accord with the present invention, plug 190 is removed from this original connection means, and a generally cylindrical bung hole adaptor 192, which has a set of external threads 194, is threaded into the rim 188. Adaptor 192 has an enlarged diameter outer portion 196 with internal threads 198 identical to the threads of rim 188, and thus defining a surrogate connection means that can receive plug 190 as shown in FIG. 7.

In addition, adaptor 192 has an in-turned shoulder 200 at its lower end, which is located within barrel 144, and has a central hole 202. A tubular stinger 204 has a female quick disconnect coupling 206 at its upper end. The coupling or fitting 206 is of a diameter small enough to fit within adaptor 192, but large enough to rest on shoulder 202, whereas stinger 204 is small enough to extend through hole 202. It can be seen that this in no way interferes with proper positioning of plug 190. Thus, the stinger 204 and its quick disconnect fitting 206 can remain in place during transit. Then, when it is time to connect and begin operation of the generator, the plug 190 is removed, and a male quick disconnect fitting 208 carried on the end of a conduit 210 is snapped into the mating fitting 206 so that the contents of the barrel 144 can be drawn up through the conduit 210.

As mentioned, each of the barrels 138, 140, 144 and 146 has such a bung hole adaptor and stinger, and there are four such conduits, each of which is connected to the stinger of a respective barrel during normal operation of the generator. More specifically, the stinger in barrel 144 is connected to conduit 210, the stinger in barrel 138 is connected to conduit 21 2, and the stinger in barrel 140 is connected to conduit 214. The other end of each of these three conduits is plugged into a respective fitting in the wall 58 so that it is connected to a respective extension conduit 210a, 212a, or 214a. As may be seen by comparing FIGS. 4 and 9, these extensions conduits in turn communicate with the respective precursor inlets 90, 92 and 94 of the generator.

Although water from barrel 146 is not needed in the generation process per se, it is convenient to have the conduit 216 preconnected to the stinger in barrel 146. The other end of conduit 216 may be connected into a fitting 215 in wall 134, whereby it is communicated with an extension 216 a, so that it is accessible to barrels 138 and 140. A spring-loaded check valve in line 216 prevents exchange of atmosphere between the two isolated compartments.

With the parts arranged as shown in FIGS. 2 and 4–6, the system is configured for treating the plant. The treatment will normally be performed in accord with the aforementioned treatment schedule, which will typically involve a relatively short treatment of chlorine dioxide at a concentration of about 2 ppm or less in the system, although somewhat higher concentrations can be used in the maintenance phase. As in the first phase, samples will be taken at points 40, 46 and 48 and tested in any way desired to confirm when the treatment is complete. For example, residual chlorine dioxide at the respective sample points may be determined and compared. Other useful tests may also be performed in the lab, as desired by the customer-by way of example only, turbidity, total dissolved solids, iron, copper, aerobic and anaerobic bacterial counts, water color, hardness levels, pH, and oxidation reduction potential. If these tests indicate that the necessary treatment time or dosage has varied significantly from the predetermined schedule, other tests and troubleshooting operations may be performed to determine the cause of the variation and/or to modify the treatment schedule for the future.

Figure 11:
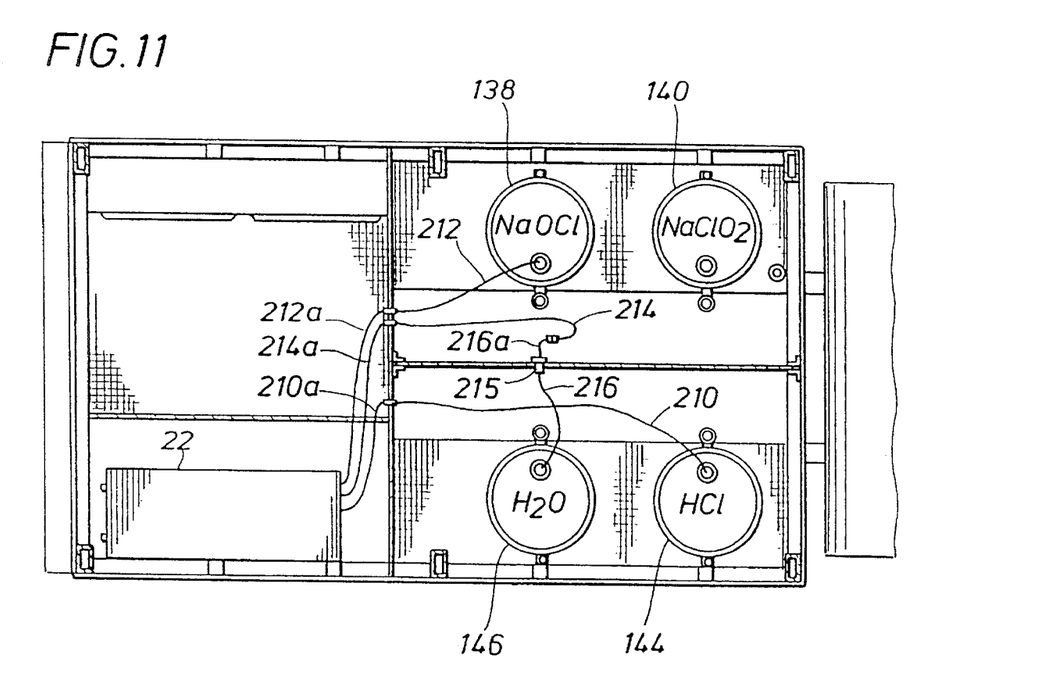
FIG. 11 is a view similar to that of FIG. 4 showing the conduits arranged for flushing of the sodium chlorite conduit.

In any case, after the treatment has been completed, but before the generator is shut down and disconnected, the various conduits 210, 212, and 214, as well as their extensions 210a, 212a, and 214a, are flushed into the generator for safety purposes. Conduit 214 for barrel 140 is preferably flushed first, since it contains the most problematic of the three precursors. To accomplish this, the conduits are reconfigured as shown in FIG. 11, and the generator is kept running. Specifically, conduit 214, which is normally connected into the stinger of barrel 140, has been connected to extension 216a, the quick disconnect coupling thereof that is located in compartment 136 being female for receipt of the male coupling end of conduit 214. This communicates conduit 214 with conduit 216, which in turn is communicating with the water barrel 146. Thus, as the generator continues to run, water flows through conduit 214 and its extension 214a, to flush them into the generator. This also flushes auxiliary flow way 100 of the generator into the main flow way.

Next, conduit 214 is disconnected altogether, and conduit 212 is disconnected from its barrel 138 and connected to extension 216a, whereby conduits 212 and 212a and flow way 98 are flushed in the same manner. Then, conduit 212 is completely disconnected. As each of the conduits 214 and 212 are disconnected from their normal chemical barrels for flushing, the plugs are immediately replaced in the bung hole adaptors of those barrels.

Figure 12:
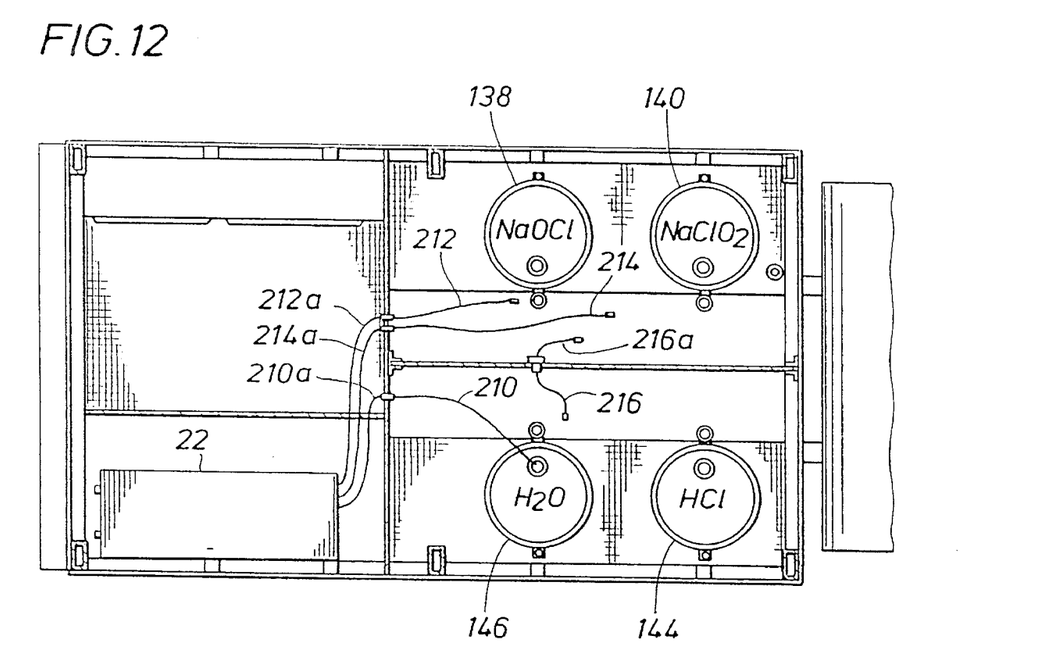
FIG. 12 is a view similar to that of FIG. 4 showing the conduits arranged for flushing the hydrochloric acid conduit.

FIG. 12 shows how the conduits are configured for the final flushing of barrel 144 of hydrochloric acid. In this case, conduit 216 is disconnected from water barrel 146, and conduit 210 is disconnected from barrel 144 and connected directly into barrel 146 so that running of the generator will cause water to flush conduit 210, its extension 210a and flow way 96.

After all of the conduits have been flushed into the generator, the generator itself is flushed into the fluid flow path of the system that has been treated. With all of the conduits disconnected, the generator is no longer able to draw in any precursors, so even though its pump 68 continues to run, it will simply be pumping water through the main flow way of the generator, and this will eventually clear the generator of all significant residual chemicals. Now the lines 32 and 34 can be disconnected, and all the generation equipment and precursors removed from the site in the vehicle 50 until it is time for the next maintenance treatment. Note that the same flushing techniques can be used after the threshold phase illustrated in FIG. 1.

It will be appreciated that this procedure relieves the owner of the facility that has been treated of the need to provide necessary precautions and facilities for the storage of dangerous chemicals, obtain permits, hire specially trained operators, etc. Yet, this owner has received the benefits of a much more effective biocide, i.e. chlorine dioxide, than that which is currently typically stored and used at the plant site by the plant's own personnel, i.e. chlorine gas.

Figure 8:
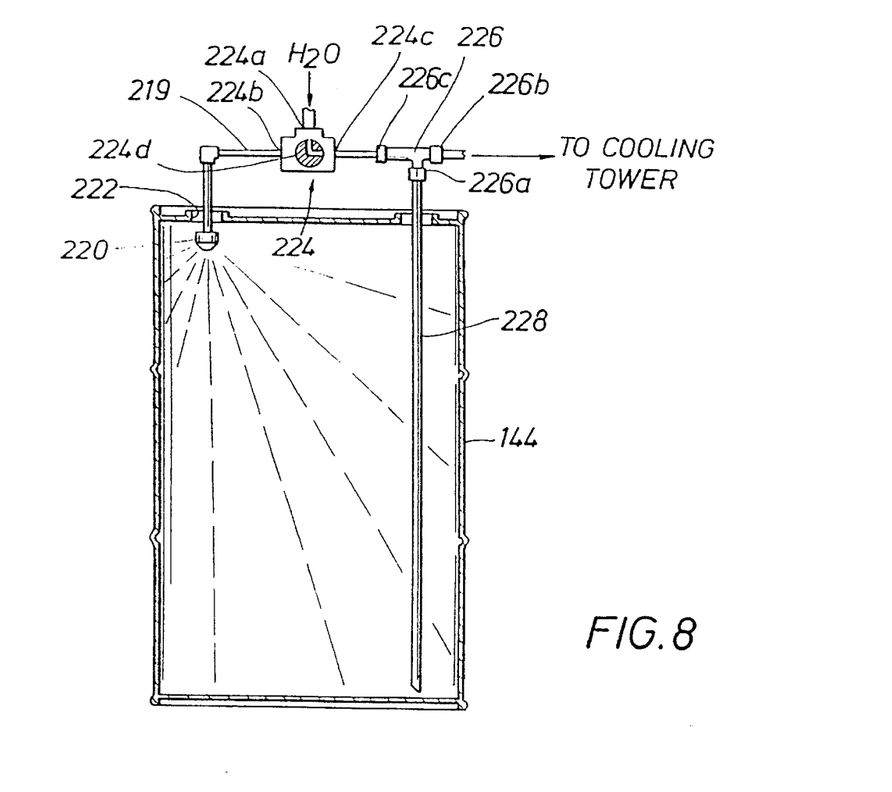
FIG. 8 is a vertical cross-sectional view through one of the precursor containers and also illustrating the rinsing subsystem in operative association with that container.

Referring finally to FIG. 8, the system also provides an evacuator subsystem that may be selectively interfaced with other parts of the system to rinse dangerous chemical residues from barrels in which there is no more usable chemical or precursor. Specifically, the normal stinger 204 and connected fitting 206 may be rinsed by injecting water thereinto, then carefully removed from the barrel and rinsed externally, e.g. into the adjacent spill containment basin. Adaptor 192 is also rinsed and removed.

The evacuator subassembly is then installed in the barrel. This subassembly includes a line 219 at one end of which is a spray head 220, followed by a three-way valve 224, a Venturi eductor 226 being disposed at the opposite end. Spray head 220 is adapted to be received in an auxiliary bung hole 222 of the barrel, while eductor 226 has a lateral branch outlet 226a to which is connected a pipe 228 adapted to be received in bung 188, with pipe 228 extending down through hole 202. (It will be appreciated that this relation could be reversed.) The eductor also has a primary axial inlet 226c and an outlet 226b.

The three-way valve 224 has a housing defining an inlet 224a that may be connected to an external water supply as by a hose, a first outlet 224b communicating with the spray head 220, and a second outlet 224c communicating with the primary inlet 226c of the eductor 226. Valve 224 also has a shiftable valve element 224d of well-known type. When this valve element is in a first position, it intercommunicates inlet 224a with first outlet 224b whereby water is sprayed into the barrel 144, rinsing down its sides and bottom. Then, the valve element 224d is shifted to its other position, whereby water is directed from its inlet 224a through its second outlet 224c, and thence into the main flow path of the eductor 226. This in turn causes a suction that draws the rinse water up through tube 228 and into the main stream, exiting the outlet 226b of the eductor. This outlet is typically connected, as by a hose, to the cooling tower of the plant being treated. Again, this subsystem has been illustrated on barrel 144, but it can be used on any of the barrels.

Many modifications of the present invention are within the skill of the art. Some examples, e.g. as to variations in the precursors, have been mentioned above.

By way of further example only, in some embodiments, it may be desired to add further ingredients, e.g. bromine compounds or iodine, to the biocide, or to use different primary precursors to generate a different biocide. Generators and dispensing systems might be devised to handle precursors in solid, e.g. powdered, form.

Although it is ordinarily preferable to transport both the generator and the precursors to the facility site for treatment, and away afterward, variations are possible in this respect as well. If a plant owner wishes to bear the expense of having its own generator, then if the generator is flushed after use, there is no danger in leaving it on site.

Precursors are ordinarily provided in ample quantities, but they could sometimes be evacuated from the site by simply using them up, rather than by transporting unused portions away.

Still other modifications could be made in the hardware.

Accordingly, it is intended that the scope of the invention be limited only by the following claims.

What is claimed is:

1. A chlorine dioxide delivery system, comprising:

a vehicle for transporting chlorine dioxide precursors overland to a facility to be treated with chlorine dioxide comprising a first compartment carrying a container of a first chlorine dioxide precursor, and a second compartment carrying a container of a second chlorine dioxide precursor incompatible with the first precursor, the first and second compartments being isolated from each other;

a chlorine dioxide generator carried in said vehicle and adapted to generate chlorine dioxide using said first and second precursors;

means for communicating the generator with a fluid flow path passing through the facility to be treated;

means for simultaneously generating chlorine dioxide in the generator from the precursors while circulating a carrier liquid through the fluid flow path and the generator, introducing the chlorine dioxide from the generator to the carrier liquid and carrying the chlorine dioxide through the facility to treat the facility;

means for isolating the precursors from the generator and continuing to circulate the carrier liquid through the fluid flow path, including the generator, to flush the generator into the facility;

means for stopping the operation of the generator; and means for evacuating the precursors from the facility site.

2. The system of claim 1 wherein the generator has a carrier inlet adapted to be connected to an external carrier liquid supply, an outlet adapted to be connected to an external liquid circulation system associated with a facility to be treated, and a main internal flow way between the carrier inlet and the outlet and communicating with a reaction chamber, whereby a carrier liquid entering the carrier inlet is directed through the generator so that biocide generated in the reaction chamber may be immediately introduced to the carrier liquid.

3. The system of claim 2 wherein the main internal flow way of the generator comprises the reaction chamber.

4. The system of claim 2 wherein the generator comprises a respective precursor inlet for each precursor and auxiliary flow way means communicating the precursor inlets with the main internal flow way upstream of or at the reaction chamber.

5. The system of claim 4 wherein the generator comprises a Venturi eductor forming a part of the main internal flow way upstream of the reaction chamber and communicating with the auxiliary flow ways, whereby carrier liquid flowing through the main flow way may cause the precursors to be sucked into the eductor and carried to the reaction chamber.

6. The system of claim 5 comprising a respective such auxiliary flow way between each of said precursor inlets and the eductor, and a respective backup valve in each of said auxiliary flow ways.

7. The system of claim 6 wherein the generator further comprises motive means in the main internal flow way for propelling liquid therethrough;

and backup operator means cooperative between the main flow way and the backup valves and adapted to close the backup valves in the absence of adequate liquid flow through the main flow way.

8. The system of claim 7 wherein the backup operator means is further adapted to close the backup valves in the absence of power to the motive means.

9. The system of claim 8 wherein the generator further comprises a main shut-off valve in the main internal flow way;

the backup operator means being further cooperative with the main shut-off valve to close the main shut-off valve in the absence of adequate water flow through the main flow way or the absence of power to the motive means.

10. The system of claim 7 wherein each of the first and second compartments has a respective drain means in the bottom thereof communicating with a respective leak containment basin carried by the vehicle therebelow, the leak containment basins being isolated from each other;

and respective evacuation means for evacuating the leak containment basins.

11. The system of claim 10 wherein the evacuation means are adapted to evacuate the basins into the generator.

12. The system of claim 11 wherein the evacuation means are also adapted to evacuate the basins to the exterior of the vehicle.

13. The system of claim 10 further comprising a generator compartment having respective drain means in the bottom thereof communicating with the containment basin for the first compartment.

14. The system of claim 2 wherein the vehicle further comprises a generator compartment housing the generator and separated from the first and second compartments.

15. The system of claim 14 further comprising first and second conduits each having a coupler end, selectively connectible with respective ones of the containers of the first and second precursors, and said conduits extending to the generator.

16. The system of claim 15 wherein the second compartment further houses a container of water;

and further comprising a third conduit with a coupler end in the second compartment selectively alternately connectible with the container of water or the container of the second precursor, and a link end distal the second compartment, accessible and selectively connectible to the connector end of the first conduit.

17. The system of claim 16 wherein each of the conduit coupler ends comprises a quick disconnect fitting of one gender, each of the containers carrying a mating quick disconnect fitting of the other gender communicating with a bung hole in the container, and the link end of the third conduit carrying a quick disconnect fitting of the other gender.

18. The system of claim 17 wherein the one gender is male, and the other gender is female.

19. The system of claim 17 wherein each of the containers has an annular original connector formation adjacent its bung hole for receipt of a plug, and a tubular bung adaptor connected to the original connector and having an outer portion defining a surrogate connector formation for receipt of the plug and an inner portion carrying the quick disconnect fitting of the other gender.

20. The system of claim 19 wherein the quick disconnect fitting of the other gender is disposed inside the container and selectively removable from the adaptor.

21. The system of claim 20 further comprising a respective tubular stinger communicatively adjoining each quick disconnect fitting of the other gender of each of the containers and extending through a hole in the adaptor to the bottom of the respective container.

22. The system of claim 2 wherein each container has a main bung hole and an auxiliary bung hole, selectively openable;

and the system further comprises a spray head selectively disposable in the auxiliary bung hole and communicable with a water source, and an evacuator subsystem having a suction tube extending through the hole in the adaptor to the bottom of the container.

23. The system of claim 22 wherein the evacuator subsystem comprises a tubular assembly communicatively interconnecting the spray head and the suction tube and comprising:

a three-way valve comprising a housing having an inlet adapted to communicate with the water source, a first outlet communicating with the spray head, and a second outlet communicating with a Venturi eductor, the three-way valve further comprising a valve element shiftable to direct fluid from the inlet selectively to either one or the other of the outlets;

the eductor having a primary inlet so communicating with the second outlet of the three-way valve, an outlet, and a lateral branch inlet communicating with the suction tube, whereby when the valve element of the three-way valve is shifted to direct water from the three-way valve through the eductor, the flow of such water will cause suction at the branch inlet to evacuate the container.

24. The system of claim 23 wherein each container has a bung adaptor connected thereto and defining a surrogate connector formation for receipt of a plug and an inner portion adapted to carry a fitting for a conduit, the bung adaptor being adapted to receive a portion of the evacuator subsystem.

25. The system of claim 1 further comprising securing means cooperative between the vehicle and the containers to prevent relative movement between the vehicle and the containers.

26. The system of claim 25 wherein the securing means comprises:
   vertically oriented placement means on the bottom of each compartment closely surrounding the bottom of the respective container;
   a holding member abutting the top of the container;
   and tie-down means applying a downward force to the holding member.

27. The system of claim 26 wherein said placement means comprises an enclosing rim, the bottom of the compartment within the rim having drain means communicating with a containment basin therebelow.

28. The system of claim 26 wherein each container is a cylindrical drum;
   and the holding member is a rigid flanged ring with vertically downwardly depending means surrounding the top of the respective drum and flange means extending inwardly to partly overlie the top of the drum.

29. The system of claim 28 wherein the tie-down means interconnects the respective flanged ring with the placement means.

30. The system of claim 29 further comprising a rigid anti-twist member extending vertically through the compartment and rigidly connected to the flanged ring.

31. The system of claim 28 further comprising a rigid anti-twist member extending vertically through the compartment and rigidly connected to the flanged ring.

32. The system of claim 31 wherein the first and second compartments are oversized with respect to the containers therein to provide crush space.

33. The system of claim 32 wherein the vehicle comprises crush-resistant roll bars about upper portions of the first and second compartments.

34. The system of claim 30 wherein the vehicle further comprises a laboratory area.

35. The system of claim 1 wherein the vehicle comprises additional storage area.

36. The system of claim 35 wherein a neutralizer for one of the precursors is carried in the additional storage area.

37. The system of claim 36 wherein protective garments are carried in the additional storage area.

* * * * *